United States Patent
Jiang et al.

(10) Patent No.: US 9,618,168 B1
(45) Date of Patent: Apr. 11, 2017

(54) LED TUBE LAMP

(71) Applicant: JIAXING SUPER LIGHTING ELECTRIC APPLIANCE CO.,LTD., Zhejiang (CN)

(72) Inventors: Tao Jiang, Zhejiang (CN); Hong Xu, Zhejiang (CN); Liqin Li, Zhejiang (CN); Chang Yang, Zhejiang (CN)

(73) Assignee: JIAXING SUPER LIGHTING ELECTRIC APPLIANCE CO., LTD, Zhejiang (CN)

( * ) Notice: Subject to any disclaimer, the term of this patent is extended or adjusted under 35 U.S.C. 154(b) by 0 days.

(21) Appl. No.: 15/211,717

(22) Filed: Jul. 15, 2016

Related U.S. Application Data

(63) Continuation-in-part of application No. 14/865,387, filed on Sep. 25, 2015, and a continuation-in-part of
(Continued)

(30) Foreign Application Priority Data

Sep. 28, 2014 (CN) .......................... 2014 1 0507660
Sep. 28, 2014 (CN) .......................... 2014 1 0508899
(Continued)

(51) Int. Cl.
*H01J 13/46* (2006.01)
*H01J 7/44* (2006.01)
(Continued)

(52) U.S. Cl.
CPC ....... *F21S 4/28* (2016.01); *F21K 9/60* (2016.08); *F21V 23/023* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS 3,294,518 A  12/1966  Laseck et al.
4,647,399 A   3/1987  Peters et al.
(Continued)

FOREIGN PATENT DOCUMENTS

CN  102121578  7/2011
CN  202125774  1/2012
(Continued)

*Primary Examiner* — Anh Tran
(74) *Attorney, Agent, or Firm* — Andrew M. Calderon; Roberts Mlotkowski Safran Cole & Calderon, P.C.

(57) ABSTRACT

An LED tube lamp includes a glass tube, two end caps, a power supply, and an LED light strip. The glass tube includes a main body region, two rear end regions, and two transition regions connecting the main body region and the rear end regions. The end cap is disposed at one end of the glass tube and the power supply is provided inside the end cap. The LED light strip is disposed inside the glass tube and has LED light sources disposed thereon. The LED light strip includes a bendable circuit sheet mounted on inner surface of the glass tube. The bendable circuit sheet of the LED light strip is formed with a freely extending end portion at one end, and the freely extending end portion is electrically connected to the power supply. The glass tube and the end cap are secured by a hot melt adhesive.

20 Claims, 8 Drawing Sheets

Related U.S. Application Data application No. 15/056,121, filed on Feb. 29, 2016, now Pat. No. 9,447,929, and a continuation-in-part of application No. 15/168,962, filed on May 31, 2016, which is a continuation-in-part of application No. PCT/CN2015/096502, filed on Dec. 5, 2015, and a continuation-in-part of application No. 15/087,092, filed on Mar. 31, 2016.

(30) Foreign Application Priority Data

| Date | | Number |
|---|---|---|
| Nov. 6, 2014 | (CN) | 2014 1 0623355 |
| Dec. 5, 2014 | (CN) | 2014 1 0734425 |
| Feb. 12, 2015 | (CN) | 2015 1 0075925 |
| Mar. 10, 2015 | (CN) | 2015 1 0104823 |
| Mar. 25, 2015 | (CN) | 2015 1 0133689 |
| Mar. 26, 2015 | (CN) | 2015 1 0134586 |
| Mar. 27, 2015 | (CN) | 2015 1 0136796 |
| Apr. 3, 2015 | (CN) | 2015 1 0155807 |
| Apr. 14, 2015 | (CN) | 2015 1 0173861 |
| Apr. 22, 2015 | (CN) | 2015 1 0193980 |
| May 19, 2015 | (CN) | 2015 1 0259151 |
| May 22, 2015 | (CN) | 2015 1 0268927 |
| May 29, 2015 | (CN) | 2015 1 0284720 |
| Jun. 10, 2015 | (CN) | 2015 1 0315636 |
| Jun. 12, 2015 | (CN) | 2015 1 0324394 |
| Jun. 17, 2015 | (CN) | 2015 1 0338027 |
| Jun. 26, 2015 | (CN) | 2015 1 0364735 |
| Jun. 26, 2015 | (CN) | 2015 1 0372375 |
| Jun. 26, 2015 | (CN) | 2015 1 0373492 |
| Jun. 29, 2015 | (CN) | 2015 1 0378322 |
| Jul. 2, 2015 | (CN) | 2015 1 0391910 |
| Jul. 10, 2015 | (CN) | 2015 1 0406595 |
| Jul. 20, 2015 | (CN) | 2015 1 0428680 |
| Jul. 27, 2015 | (CN) | 2015 1 0448220 |
| Aug. 7, 2015 | (CN) | 2015 1 0482944 |
| Aug. 8, 2015 | (CN) | 2015 1 0483475 |
| Aug. 8, 2015 | (CN) | 2015 1 0486115 |
| Aug. 14, 2015 | (CN) | 2015 1 0499512 |
| Sep. 2, 2015 | (CN) | 2015 1 0555543 |
| Sep. 6, 2015 | (CN) | 2015 1 0557717 |
| Sep. 18, 2015 | (CN) | 2015 1 0595173 |
| Oct. 8, 2015 | (CN) | 2015 1 0645134 |
| Oct. 29, 2015 | (CN) | 2015 1 0716899 |
| Nov. 27, 2015 | (CN) | 2015 1 0848766 |
| Dec. 2, 2015 | (CN) | 2015 1 0868263 |
| Jan. 22, 2016 | (CN) | 2016 1 0044148 |
| Mar. 25, 2016 | (CN) | 2016 1 0177706 |
| May 18, 2016 | (CN) | 2016 1 0327806 |

(51) Int. Cl.

| | |
|---|---|
| *H01J 17/34* | (2006.01) |
| *H01J 19/78* | (2006.01) |
| *H01J 23/16* | (2006.01) |
| *H01J 29/96* | (2006.01) |
| *H01K 1/62* | (2006.01) |
| *F21S 4/28* | (2016.01) |
| *F21V 23/02* | (2006.01) |
| *F21K 9/60* | (2016.01) |
| *F21Y 115/10* | (2016.01) |
| *F21Y 103/10* | (2016.01) |

(56) References Cited

U.S. PATENT DOCUMENTS

| | | |
|---|---|---|
| 5,575,459 A | 11/1996 | Anderson |
| 5,921,660 A | 7/1999 | Yu |
| 6,118,072 A | 9/2000 | Scott |
| 6,127,783 A | 10/2000 | Pashley et al. |
| 6,211,262 B1 | 4/2001 | Mejiritski et al. |
| 6,609,813 B1 | 8/2003 | Showers et al. |
| 6,796,680 B1 | 9/2004 | Showers et al. |
| 6,936,855 B1 | 8/2005 | Harrah et al. |
| 7,033,239 B2 | 4/2006 | Cunkelman et al. |
| 7,067,032 B1 | 6/2006 | Bremont et al. |
| 8,360,599 B2 | 1/2013 | Ivey et al. |
| 8,579,463 B2 | 11/2013 | Clough |
| 2002/0044456 A1 | 4/2002 | Balestriero et al. |
| 2003/0231485 A1 | 12/2003 | Chien |
| 2004/0095078 A1 | 5/2004 | Leong |
| 2004/0189218 A1 | 9/2004 | Leong et al. |
| 2005/0128751 A1 | 6/2005 | Roberge et al. |
| 2005/0162850 A1* | 7/2005 | Luk ............... H05B 33/0857 362/227 |
| 2005/0207166 A1 | 9/2005 | Kan et al. |
| 2005/0213321 A1 | 9/2005 | Lin |
| 2006/0028837 A1 | 2/2006 | Mrakovich et al. |
| 2007/0001709 A1 | 1/2007 | Shen |
| 2007/0145915 A1 | 6/2007 | Roberge et al. |
| 2007/0210687 A1 | 9/2007 | Axelsson |
| 2007/0274084 A1 | 11/2007 | Kan et al. |
| 2008/0030981 A1 | 2/2008 | Mrakovich et al. |
| 2008/0192476 A1 | 8/2008 | Hiratsuka |
| 2008/0278941 A1 | 11/2008 | Logan et al. |
| 2009/0161359 A1 | 6/2009 | Siemiet et al. |
| 2009/0290334 A1* | 11/2009 | Ivey ............... F21V 23/06 362/219 |
| 2010/0253226 A1 | 10/2010 | Oki |
| 2011/0038146 A1 | 2/2011 | Chen |
| 2011/0057572 A1 | 3/2011 | Kit et al. |
| 2011/0090684 A1 | 4/2011 | Logan et al. |
| 2011/0216538 A1 | 9/2011 | Logan et al. |
| 2012/0069556 A1 | 3/2012 | Bertram et al. |
| 2012/0106157 A1 | 5/2012 | Simon et al. |
| 2012/0146503 A1 | 6/2012 | Negley et al. |
| 2012/0153873 A1 | 6/2012 | Hayashi et al. |
| 2012/0169968 A1 | 7/2012 | Ishimori et al. |
| 2012/0293991 A1 | 11/2012 | Lin |
| 2012/0319150 A1 | 12/2012 | Shimomura et al. |
| 2013/0033888 A1 | 2/2013 | Wel et al. |
| 2013/0050998 A1 | 2/2013 | Chu et al. |
| 2013/0170245 A1 | 7/2013 | Hong et al. |
| 2013/0182425 A1 | 7/2013 | Seki et al. |
| 2013/0256704 A1 | 10/2013 | Hsiao et al. |
| 2013/0313983 A1* | 11/2013 | Radermacher ..... H05B 33/0803 315/187 |
| 2014/0071667 A1 | 3/2014 | Hayashi et al. |
| 2014/0153231 A1 | 6/2014 | Bittmann |
| 2014/0226320 A1 | 8/2014 | Halliwell et al. |
| 2015/0009688 A1 | 1/2015 | Timmermans et al. |
| 2016/0081147 A1* | 3/2016 | Guang ............. H05B 33/0803 315/123 |
| 2016/0091147 A1 | 3/2016 | Jiang et al. |
| 2016/0091156 A1 | 3/2016 | Li et al. |
| 2016/0091179 A1 | 3/2016 | Jiang et al. |
| 2016/0102813 A1 | 4/2016 | Ye et al. |
| 2016/0178135 A1 | 6/2016 | Xu et al. |
| 2016/0178137 A1 | 6/2016 | Jiang |
| 2016/0178138 A1 | 6/2016 | Jiang |
| 2016/0198535 A1 | 7/2016 | Ye et al. |

FOREIGN PATENT DOCUMENTS

| | | |
|---|---|---|
| CN | 102518972 | 6/2012 |
| CN | 102720901 | 10/2012 |
| CN | 102889446 | 1/2013 |
| CN | 203240337 | 10/2013 |
| CN | 203489210 | 3/2014 |
| CN | 203615157 | 5/2014 |

(56) References Cited

FOREIGN PATENT DOCUMENTS

| | | |
|---|---|---|
| CN | 103851547 | 6/2014 |
| CN | 203771102 | 8/2014 |
| CN | 203927469 | 11/2014 |
| CN | 204268162 | 4/2015 |
| CN | 204300737 | 4/2015 |
| CN | 104595765 | 5/2015 |
| CN | 104633497 | 5/2015 |
| CN | 204420636 | 6/2015 |
| GB | 2523275 | 8/2015 |
| JP | 2008117666 | 5/2008 |
| JP | 2011061056 | 3/2011 |
| WO | 2011132120 | 10/2011 |
| WO | 2013125803 | 8/2013 |
| WO | 2014001475 | 1/2014 |
| WO | 2014118754 | 8/2014 |
| WO | 2015036478 | 3/2015 |

\* cited by examiner

LED TUBE LAMP

CROSS-REFERENCE TO RELATED APPLICATIONS

This application is a continuation-in-part application claiming benefits of U.S. application Ser. No. 14/865,387 filed on 2015 Sep. 25, U.S. application Ser. No. 15/056,121 filed on 2016 Feb. 29, and U.S. application Ser. No. 15/168,962 filed on 2016 May 31, the disclosures of which are incorporated herein in their entirety by reference.

TECHNICAL FIELD

The instant disclosure relates to illumination devices, and, more particularly, to an LED tube lamp and components thereof comprising the LED light sources, a tube, electronic components, and end caps.

RELATED ART

LED lighting technology is rapidly developing to replace traditional incandescent and fluorescent lightings. LED tube lamps are mercury-free in comparison with fluorescent tube lamps that need to be filled with inert air and mercury. Thus, it is not surprising that LED tube lamps are becoming a highly desired illumination option among different available lighting systems used in homes and workplaces, which used to be dominated by traditional lighting options such as compact fluorescent light bulbs (CFLs) and fluorescent tube lamps. Benefits of LED tube lamps include improved durability and longevity and far less energy consumption; therefore, when taking into account all factors, they would typically be considered as a cost effective lighting option.

The basic structure of the traditional LED tube lamps include a tube, two end caps at two ends of the tube, a substrate inside the tube, LEDs on the substrate, and a power supply inside the end caps. The substrate disposed inside the tube and having LEDs mounted on is rigid and straight printed circuit board, which makes the tube remain a straight appearance even it is partially ruptured or broken. As a result, user cannot easily aware that the tube is damaged and might be exposed to a dangerous situation.

In addition, the rigid substrate of the traditional LED tube lamp is typically electrically connected with the end caps by way of wire bonding, in which the wires may be easily damaged and even broken due to any move during manufacturing, transportation, and usage of the LED tube lamp and therefore may disable the LED tube lamp.

Further, the tube and the end caps of the traditional LED tube lamp are often secured together by tight fit, making the reliability cannot be further improved.

SUMMARY

To address the above issue, the instant disclosure provides embodiments of an LED tube lamp.

According to an embodiment, an LED tube lamp includes a glass tube, two end caps, a power supply, and an LED light strip. The glass tube includes an inner surface and an outer surface. At least part of the inner surface of the glass tube is formed with a rough surface and the roughness of the rough surface is higher than that of the outer surface. The glass tube also includes a main body region, two rear end regions, and two two-arc-shaped transition regions connecting the main body region and the rear end regions. The end cap is disposed at one end of the glass tube and the power supply is provided inside the end cap. The LED light strip is disposed inside the glass tube and provided with a plurality of LED light sources disposed thereon. The LED light strip includes a bendable circuit sheet mounted on an inner surface of the glass tube to electrically connect the LED light sources with the power supply. The projected length of the bendable circuit sheet is larger than the length of the glass tube such that a freely extending end portion is formed at one end of the bendable circuit sheet along a longitudinal direction of the glass tube. The freely extending end portion is electrically connected to the power supply, and the glass tube and the end cap are secured by a hot melt adhesive.

According to an embodiment, the roughness of the rough surface is from 0.1 to 40 µm.

According to an embodiment, the bendable circuit sheet includes a circuit layer and a circuit protecting layer, the circuit protecting layer is disposed on the circuit layer.

According to an embodiment, the rough surface is formed as a light scattering region.

According to an embodiment, the LED tube lamp further includes a reflective film disposed on a part of the inner surface of the glass tube which is not formed with the rough surface.

According to an embodiment, a ratio of a length of the reflective film disposed on the inner surface of the glass tube extending along the circumferential direction of the glass tube to a circumferential length of the tube is about 0.3 to 0.5.

According to an embodiment, the two end caps are respectively connected to two opposite ends of the LED tube, wherein the power supply is in one end cap or divided into two parts respectively in the two end caps. The power supply may be in the form of a single integrated unit (e.g., with all components of the power supply are within a body) disposed in an end cap at one end of the glass tube. Alternatively, the power supply may be in form of two separate parts (e.g., with the components of the power supply are separated into two pieces) respectively disposed in two end caps. The power supply may supply or provide power from external signal(s), such as from an AC power line or from a ballast, to an LED module and the LED light sources.

According to another embodiment, an LED tube lamp includes a glass tube, two end caps, a power supply, and an LED light strip. The glass tube is covered by a heat shrink sleeve and includes a main body region, two rear end regions, and two transition regions narrowed down or tapering smoothly and continuously from the main body region to the rear end regions connecting the main body region and the rear end regions. The end cap is disposed at one end of the glass tube, and the power supply is provided inside the end cap. The LED light strip is disposed inside the glass tube and provided with a plurality of LED light sources disposed thereon. The LED light strip includes a bendable circuit sheet mounted on an inner surface of the glass tube to electrically connect the LED light sources with the power supply. The projected length of the bendable circuit sheet is larger than the length of the glass tube such that a freely extending end portion is formed at one end of the bendable circuit sheet along a longitudinal direction of the glass tube. The freely extending end portion is electrically connected to the power supply. The glass tube and the end cap are secured by a hot melt adhesive.

According to another embodiment, the thickness of the heat shrink sleeve ranges from 20 µm to 200 µm.

According to another embodiment, the heat shrink sleeve is substantially transparent with respect to the wavelength of light from the LED light sources.

According to another embodiment, the bendable circuit sheet includes a circuit layer and a circuit protecting layer, the circuit protecting layer is disposed on the circuit layer. Moreover, in some embodiments, the projected length of the bendable circuit sheet is greater than the length of the glass tube (not including the length of the two end caps respectively connected to two ends of the glass tube), or at least greater than a central portion of the glass tube between two transition regions (e.g., where the circumference of the tube narrows) on either end. In one embodiment, the longitudinally projected length of the bendable circuit sheet as the LED light strip is larger than the length of the glass tube.

According to another embodiment, the LED tube lamp further includes a reflective film disposed on a part of the inner surface of the glass tube.

According to another embodiment, a ratio of a length of the reflective film disposed on the inner surface of the glass tube extending along the circumferential direction of the glass tube to a circumferential length of the tube is about 0.3 to 0.5.

According to another embodiment, the two end caps are respectively connected to two opposite ends of the LED tube, wherein the power supply is divided into two parts respectively in the two end caps.

According to a further embodiment, an LED tube lamp includes a glass tube, two end caps, a power supply, and an LED light strip. The glass tube includes a main body region, two rear end regions, and two transition regions narrowed down or tapering smoothly and continuously from the main body region to the rear end regions connecting the main body region and the rear end regions. In other words, in the transition region, the glass tube narrows, or tapers to have a smaller diameter when moving along the length of the glass tube from the main body region to the rear end regions. The tapering/narrowing may occur in a continuous, smooth manner (e.g., to be a smooth curve without any linear angles). By avoiding angles, in particular any acute angles, the glass tube is less likely to break or crack under pressure. Furthermore, the transition region is formed by two curves at both ends, wherein one curve is toward inside of the glass tube and the other curve is toward outside of the glass tube. For example, one curve closer to the main body region is convex from the perspective of an inside of the glass tube and one curve closer to the rear end region is concave from the perspective of an inside of the glass tube. The transition region of the glass tube in one embodiment includes only smooth curves, and does not include any angled surface portions. The end cap is disposed at one end of the glass tube. The power supply is provided inside the end cap and includes a printed circuit board. The LED light strip is disposed inside the glass tube and provided with a plurality of LED light sources disposed thereon. The LED light strip includes a bendable circuit sheet mounted on an inner surface of the glass tube. The projected length of the bendable circuit sheet is larger than that of the glass tube such that a freely extending end portion is formed at one end of the bendable circuit sheet along a longitudinal direction of the glass tube. The freely extending end portion of the bendable circuit sheet of the LED light strip is electrically connected to the printed circuit board of the power supply directly. The glass tube and the end cap are secured by a hot melt adhesive.

According to a further embodiment, the power supply includes at least one electronic component disposed on one side of the printed circuit board, and the freely extending end portion is electrically connected to the printed circuit board through the other side.

According to another embodiment, the glass tube comprises two rear end regions and a main body region, the two rear end regions are at two opposite ends of the main body region, the two rear end regions relative to the main body region are shrunk in a radial direction of the glass tube, and the two end caps are respectively connected to the two rear end regions. In other words, in the transition region, the glass tube narrows, or tapers to have a smaller diameter when moving along the length of the glass tube from the main body region to the rear end region. The tapering/narrowing may occur in a continuous, smooth manner (e.g., to be a smooth curve without any linear angles). By avoiding angles, in particular any acute angles, the glass tube is less likely to break or crack under pressure. Furthermore, the transition region is formed by two curves at both ends, wherein one curve is toward inside of the glass tube and the other curve is toward outside of the glass tube. For example, one curve closer to the main body region is convex from the perspective of an inside of the glass tube and one curve closer to the rear end region is concave from the perspective of an inside of the glass tube. The transition region of the glass tube in one embodiment includes only smooth curves, and does not include any angled surface portions.

According to a further embodiment, the power supply may be in the form of a single integrated unit (e.g., with all components of the power supply are within a body) disposed in an end cap at one end of the glass tube. Alternatively, the power supply may be in form of two separate parts (e.g., with the components of the power supply are separated into two pieces) respectively disposed in two end caps. The power supply may supply or provide power from external signal(s), such as from an AC power line or from a ballast, to an LED module and the LED light sources.

Moreover, in some embodiments, the projected length of the bendable circuit sheet is greater than the length of the glass tube (not including the length of the two end caps respectively connected to two ends of the glass tube), or at least greater than a central portion of the tube between two transition regions (e.g., where the circumference of the tube narrows) on either end. In one embodiment, the longitudinally projected length of the bendable circuit sheet as the LED light strip is larger than the length of the glass tube.

According to a further embodiment, the bendable circuit sheet includes a circuit layer and a circuit protecting layer disposed on the circuit layer.

According to a further embodiment, the circuit protecting layer of the freely extending end portion contacts the other side of the printed circuit board.

According to a further embodiment, the printed circuit board includes a through hole, and the freely extending end portion includes a notch corresponding to the through hole.

According to a further embodiment, the LED tube lamp further includes a soldering material penetrating the through hole and filling into the notch, so as to make the freely extending end portion be electrically connected to the printed circuit board According to the embodiments of the LED tube lamp of the instant disclosure, the light strip is mounted on the inner surface of the glass tube, such that the tube will not remain a straight appearance when it is partially ruptured or broken. Therefore, user can easily aware that the structure of the tube is damaged and stop using it. In addition, the bendable circuit sheet of the LED light strip is electrically connected to the power supply directly by the freely extending end portion formed at one end of the bendable circuit sheet rather than by traditional wire bonding, which remarkably lowers down the possibility of disconnection occurred between the LED light strip and the power supply during manufacturing, transportation, and usage of the LED tube lamp. Further, the glass tube and the end cap are secured by the hot melt adhesive, such that the reliability is improved. The degree of vacuum of the tube is preferably below 0.001 Pa~1 Pa, and reduce the problem of internal damp. Meanwhile, the hot melt adhesive may be used to electrically insulate the glass tube and the end caps to prevent from any possible electrical shock when the glass tube is damaged.

DETAILED DESCRIPTION

Figure 1:
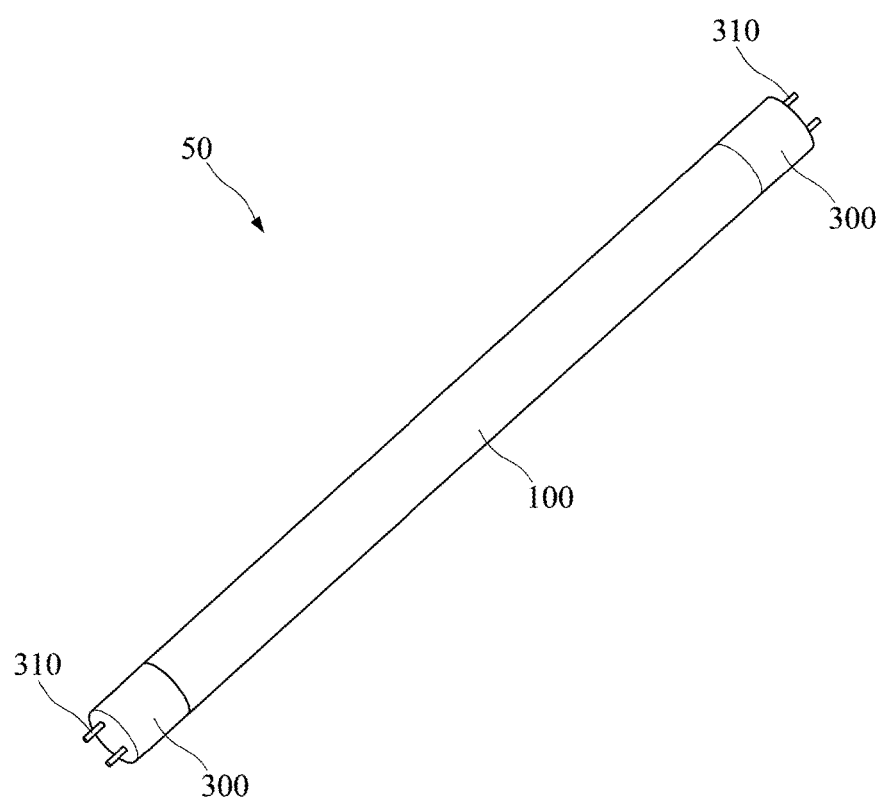
FIG. 1 illustrates a perspective view of an LED tube lamp according to an embodiment of the instant disclosure.

The instant disclosure provides an LED tube lamp to solve the abovementioned problems. The instant disclosure will now be described more fully hereinafter with reference to the accompanying drawings, in which exemplary embodiments of the disclosure are shown. This disclosure may, however, be embodied in many different forms and should not be construed as limitation to the embodiments set forth herein. Rather, these embodiments are provided so that this disclosure will be thorough and complete, and will fully convey the scope of the disclosure to those skilled in the art. Like reference numerals refer to like elements throughout.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

It will be understood that the term "and/or" includes any and all combinations of one or more of the associated listed items. It will also be understood that, although the terms first, second, third etc. may be used herein to describe various elements, components, regions, parts and/or sections, these elements, components, regions, parts and/or sections should not be limited by these terms. These terms are only used to distinguish one element, component, region, part or section from another element, component, region, part or section. Thus, a first element, component, region, part or section discussed below could be termed a second element, component, region, part or section without departing from the teachings of the present disclosure.

The following description with reference to the accompanying drawings is provided to explain the exemplary embodiments of the disclosure. Note that in the case of no conflict, the embodiments of the present disclosure and the features of the embodiments may be arbitrarily combined with each other.

Figure 2:
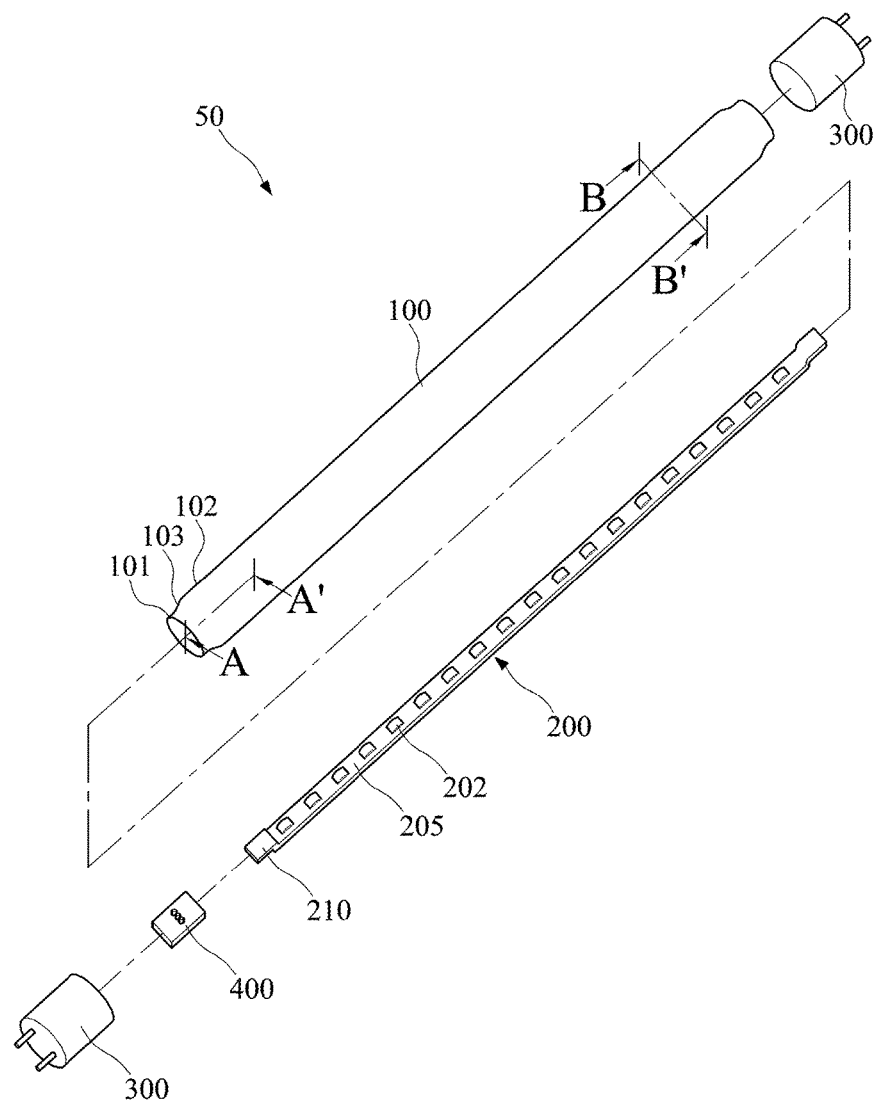
FIG. 2 illustrates an exploded view of an LED tube lamp according to an embodiment of the instant disclosure.
Figure 3:
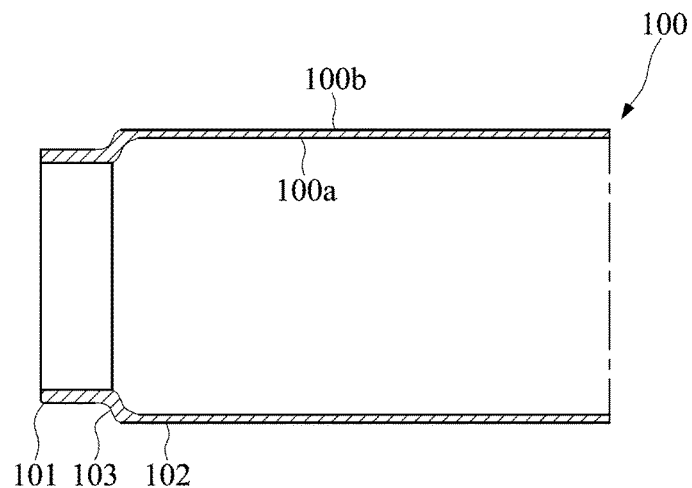
FIG. 3 illustrates a part of cross section of FIG. 2 along line A-A'.

Referring to FIG. 1, FIG. 2, and FIG. 3, the instant disclosure provides an embodiment of an LED tube lamp 50 including a glass tube 100, an LED light strip 200, two end caps 300, and a power supply 400. The glass tube 100 includes an inner surface 100*a* and an outer surface 100*b*. The LED light strip 200 is disposed inside the glass tube 100 and has a bendable circuit sheet 205 mounted on the inner surface 100*a* of the glass tube 100. The two end caps 300, which can have the same size or have different sizes, are respectively disposed on two ends of the glass tube 100 and secured with the glass tube 100 by a hot melt adhesive. The degree of vacuum of the glass tube 100 is below 0.001 Pa~1 Pa, and reduce the problem of internal damp. After heating up the hot melt adhesive, and upon expansion due to heat absorption, the hot melt adhesive flows, and then solidifies upon cooling, thereby bonding together the end cap 300 to the glass tube 100 (not shown). The volume of the hot melt adhesive may expand to about 1.3 times the original size when heated from room temperature (e.g., between about 15 and 30 degrees Celsius) to about 200 to 250 degrees Celsius. The end cap 300 and the end of the glass tube 100 could be secured by using the hot melt adhesive and therefore qualified in a torque test of about 1.5 to about 5 newton-meters (Nt-m) and/or in a bending test of about 5 to about 10 newton-meters (Nt-m). During the heating and solidification of the hot melt adhesive, the heat and pressure inside the end cap increase and are then released through at least one opening on the end cap 300. After the hot melt adhesive hardens, the end cap 300 can be firmly fixed to the glass tube 100. Under the circumstances, the end cap 300 and the glass tube 100 is hard to disassemble unless the hardened hot melt adhesive returns to liquid state by certain process. The design of the LED tube lamp 50 is to take into account both the convenience regarding the assembling process of the LED tube lamp 50 and the robustness regarding the assembled LED tube lamp 50. Several LED light sources 202 are disposed on the bendable circuit sheet 205 of the LED light strip 200, and the power supply 400 is disposed in one of the end caps 300. The LED light sources 202 and the power supply 400 can be electrically connected to each other directly via the bendable circuit sheet 205 of the LED light strip 200. Middle part of the bendable circuit sheet 205 can be mounted on the inner surface 100*a* of the glass tube 100. Instead, at least one of the two opposite, short edges of the bendable circuit sheet 205 is not mounted on the inner surface 100a of the glass tube 100 and may be formed as a freely extending end portion 210. The freely extending end portions 210 extends outside the glass tube 100 through one of two opposite ends of the glass tube 100 along the axial direction of the glass tube 100. The freely extending end portion 210 can extend into the end caps 300 and can be electrically connected to the power supply 400 directly. The power supply 400 may be in the form of a single integrated unit (e.g., with all components of the power supply 400 are within a body) disposed in an end cap 300 at one end of the glass tube 100. Alternatively, the power supply 400 may be in form of two separate parts (e.g., with the components of the power supply 400 are separated into two pieces) respectively disposed in two end caps 300. The power supply may supply or provide power from external signal(s), such as from an AC power line or from a ballast, to an LED module and the LED light sources. Each of the end caps 300 includes a pair of hollow conductive pins 310 utilized for being connected to an outer electrical power source. When the LED tube lamp 50 is installed to a lamp base, the hollow conductive pins 310 are plugged into corresponding conductive sockets of the lamp base such that the LED tube lamp 50 can be electrically connected to the lamp base.

In one embodiment, the LED light strip 200 comprises a bendable circuit sheet 205 which includes a wiring layer and a dielectric layer that are in a stacked arrangement, wherein the wiring layer and the dielectric layer have same area or the wiring layer has a bit less area (not shown) than the dielectric layer. The LED light source 202 is disposed on a surface of the wiring layer away from the dielectric layer. In other words, the dielectric layer is disposed on the wiring layer away from the LED light sources 202. The wiring layer is electrically connected to the power supply 400 to carry direct current (DC) signals. Meanwhile, an adhesive sheet is disposed on a surface of the dielectric layer away from the wiring layer to bond and to fix the dielectric layer to the inner circumferential surface of the glass tube 100. The wiring layer can be a metal layer serving as a power supply layer, or can be bonding wires such as copper wire. In an alternative embodiment, the LED light strip 200 further includes a circuit protection layer (not shown) cover each outer surface of the wiring layer and the dielectric layer. In another alternative embodiment, the dielectric layer can be omitted, in which the wiring layer is directly bonded to the inner circumferential surface of the glass tube 100. The circuit protection layer can be an ink material, possessing functions as solder resist and optical reflectance. Alternatively, the bendable circuit sheet 205 is a one-layered structure which is consist of one wiring layer only, and then the surface of the wiring layer is covered with a circuit protection layer of ink material as mentioned above, wherein an opening is configured over the circuit protection layer to electrically connect the LED light source 202 with the wiring layer. Whether the wiring layer has a one-layered, or two-layered structure, the circuit protective layer can be adopted. The circuit protection layer can be disposed on the side/surface of the LED light strip 200, such as the same surface of the wiring layer which has the LED light source 202 disposed thereon.

It should be noted that, in the present embodiment, the bendable circuit sheet 205 is a one-layered structure made of just one layer of the wiring layer, or a two-layered structure (made of one layer of the wiring layer and one layer of the dielectric layer), and thus would be more bendable or flexible to curl than the conventional three-layered flexible substrate. As a result, the bendable circuit sheet 205 (the LED light strip 200) of the present embodiment can be installed in a glass tube 100 that is of a customized shape or non-linear shape, and the bendable circuit sheet 205 can be mounted touching the sidewall of the glass tube 100. The bendable circuit sheet 205 mounted closely to the inner surface of the tube wall is one preferred configuration, and the fewer number of layers thereof, the better the heat dissipation effect, and the lower the material cost. Of course, the bendable circuit sheet 205 is not limited to being a one-layered or two-layered structure only; in other embodiments, the bendable circuit sheet 205 can include multiple layers of the wiring layers and multiple layers of the dielectric layers, in which the dielectric layers and the wiring layers are sequentially stacked in a staggered manner, respectively, to be disposed on the surface of the one wiring layer that is opposite from the surface of the one wiring layer which has the LED light source 202 disposed thereon.

In one embodiment, the LED light strip 200 includes a bendable circuit sheet 205 having in sequence a first wiring layer, a dielectric layer, and a second wiring layer (not shown). The thickness of the second wiring layer is greater than that of the first wiring layer, and/or the projected length of the LED light strip 200 is greater than that of the glass tube 100. The end region of the light strip 200 extending beyond the end portion of the glass tube 100 without disposition of the LED light source 202 is formed with two separate through holes to respectively electrically communicate the first wiring layer and the second wiring layer (not shown). The through holes are not communicated to each other to avoid short.

In this way, the greater thickness of the second wiring layer allows the second wiring layer to support the first wiring layer and the dielectric layer, and meanwhile allow the LED light strip 200 to be mounted onto the inner circumferential surface without being liable to shift or deform, and thus the yield rate of product can be improved. In addition, the first wiring layer and the second wiring layer are in electrical communication such that the circuit layout of the first wiring layer can be extended downward to the second wiring layer to reach the circuit layout of the entire LED light strip 200. In some circumstances, the first wiring layer connects the anode and the second wiring layer connects the cathode. Moreover, since the land for the circuit layout becomes two-layered, the area of each single layer and therefore the width of the LED light strip 200 can be reduced such that more LED light strips 200 can be put on a production line to increase productivity. Furthermore, the first wiring layer and the second wiring layer of the end region of the LED light strip 200 that extends beyond the end portion of the tube 100 without disposition of the LED light source 202 can be used to accomplish the circuit layout of a power supply 400 so that the power supply 400 can be directly disposed on the bendable circuit sheet 205 of the LED light strip 200.

In another embodiment, the projected length of the bendable circuit sheet 205 as the LED light strip 200 in a longitudinal projection is larger than the length of the glass tube 100. The LED light source 202 is disposed on the uppermost layer of the wiring layers, and is electrically connected to the power supply 400 through the (uppermost) wiring layer. Furthermore, the inner peripheral surface of the glass tube 100 or the outer circumferential surface thereof is covered with an adhesive film (not shown), for the sake of isolating the inner content from outside content of the glass tube 100 after the glass tube 100 has been ruptured. The present embodiment has the adhesive film coated on the inner peripheral surface of the glass tube 100 (not shown).

Moreover, in some embodiments, the projected length of the bendable circuit sheet is greater than the length of the glass tube 100 (not including the length of the two end caps 300 respectively connected to two ends of the glass tube 100), or at least greater than a central portion of the glass tube 100 between two transition regions (e.g., where the circumference of the tube narrows) on either end. In one embodiment, the longitudinally projected length of the bendable circuit sheet as the LED light strip 200 is larger than the length of the glass tube 100.

As shown in FIG. 3, the glass tube 100 includes a main body region 102, two rear end regions 101, and two two-arc-shaped transition regions 103 narrowed down or tapering smoothly and continuously from the main body region to the rear end regions connecting the main body region 102 and the rear end regions 101. In other words, in the transition regions 103, the glass tube 100 narrows, or tapers to have a smaller diameter when moving along the length of the glass tube 100 from the main body region 102 to the rear end regions 101. The tapering/narrowing may occur in a continuous, smooth manner (e.g., to be a smooth curve without any linear angles). By avoiding angles, in particular any acute angles, the glass tube 100 is less likely to break or crack under pressure. Furthermore, the transition region 103 is formed by two curves at both ends, wherein one curve is toward inside of the glass tube 100 and the other curve is toward outside of the glass tube 100. For example, one curve closer to the main body region 102 is convex from the perspective of an inside of the glass tube 100 and one curve closer to the rear end region 101 is concave from the perspective of an inside of the glass tube 100. The transition region 103 of the glass tube 100 in one embodiment includes only smooth curves, and does not include any angled surface portions. The outer diameter of the rear end region 101 is smaller than that of the main body region 102. Therefore, a height difference between the rear end region 101 and the main body region 102 is formed to avoid adhesives applied on the rear end region 101 being overflowed onto the main body region 102, and thereby saves manpower for removing the overflowed adhesive and increases productivity.

In one embodiment, at least part of the inner surface 100a of the glass tube 100 is formed with a rough surface and the roughness of the inner surface 100a is higher than that of the outer surface 100b, such that the light from the LED light sources 202 can be uniformly spread when transmitting through the glass tube 100. Since LED light sources 202 consists of several point light sources (LED dies), each LED light source 202 casts a cone of light, which results in non-uniformity of light output intensity. With the rough surface, the light from LED light sources 202 will be diffused before transmitting through the glass tube 100 and the uniformity of light output is improved thereby. In one embodiment, by making the roughness of the inner surface 100a to be from 0.1 to 40 μm, the light from LED light sources 202 will be well diffused before entirely transmitting through the glass tube 100 and the uniformity of light output is substantially improved. However, in some embodiments, the inner surface 100a of the glass tube 100 is not formed with the roughness surface.

Figure 4:
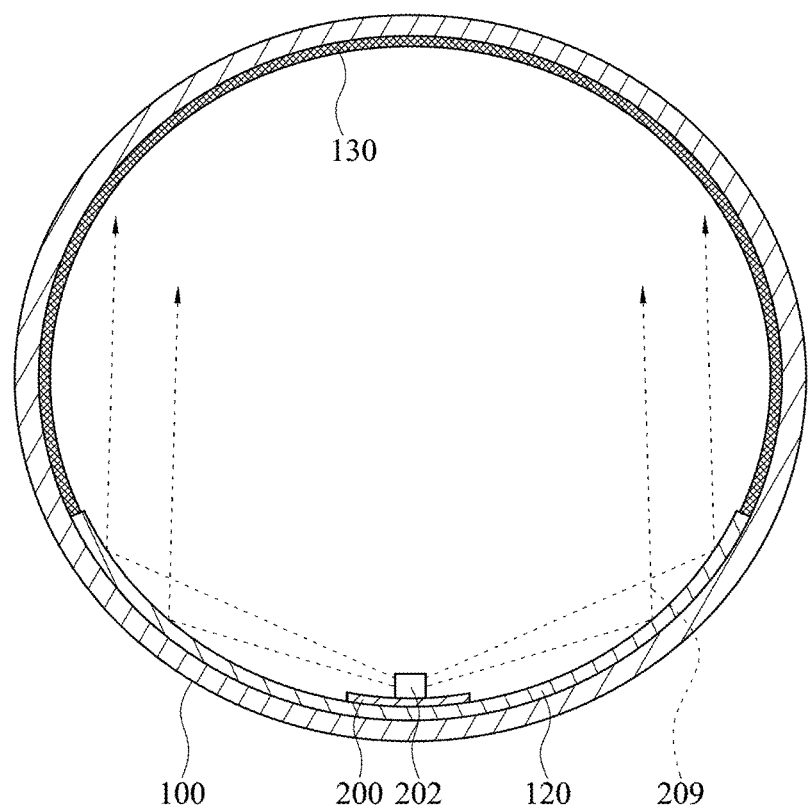
FIG. 4 illustrates a part of cross section of FIG. 2 along line B-B'.

In one embodiment, as shown in FIG. 4, the rough surface may be formed with a light scattering region 130. Since LED light sources 202 consists of several point light sources (LED dies), each LED light source 202 casts a cone of light, which results in non-uniformity of light output intensity. With the light scattering region 130, the light from LED light sources 202 will be scattered before entirely transmitting through the glass tube 100 and the uniformity of light output is substantially improved.

In one embodiment, as shown in FIG. 4, the glass tube 100 may further include a reflective film 120 disposed on a part of the inner surface 100a of the glass tube 100. In some embodiments, the reflective film 120 may be positioned on two sides of the LED light strip 200. As shown in FIG. 4, part of light 209 from LED light sources 202 are reflected by the reflective films 120 such that the light 209 from the LED light sources 202 can be centralized to a determined direction. And, in some embodiment, a ratio of a length of the reflective film 120 disposed on the inner surface 100a of the glass tube 100 extending along the circumferential direction of the glass tube 100 to a circumferential length of the glass tube 100 may be about 0.3 to 0.5, which means about 30% to 50% of the inner surface area may be covered by the reflective film 120. The reflective film 120 may be made of PET with some refractive materials such as strontium phosphate or barium sulfate or any combination thereof, with a thickness between about 140 μm and about 350 μm or between about 150 μm and about 220 μm for a more preferred effect in some embodiments. In some embodiments, only the part of the inner surface 100a which is not covered by the reflective film 120 is formed with the light scattering region 130 as shown in FIG. 4. In other words, the reflective film 120 is disposed on a part of the inner surface 100a of the glass tube 100 which is not formed with the rough surface or the light scattering region 130.

Figure 5:
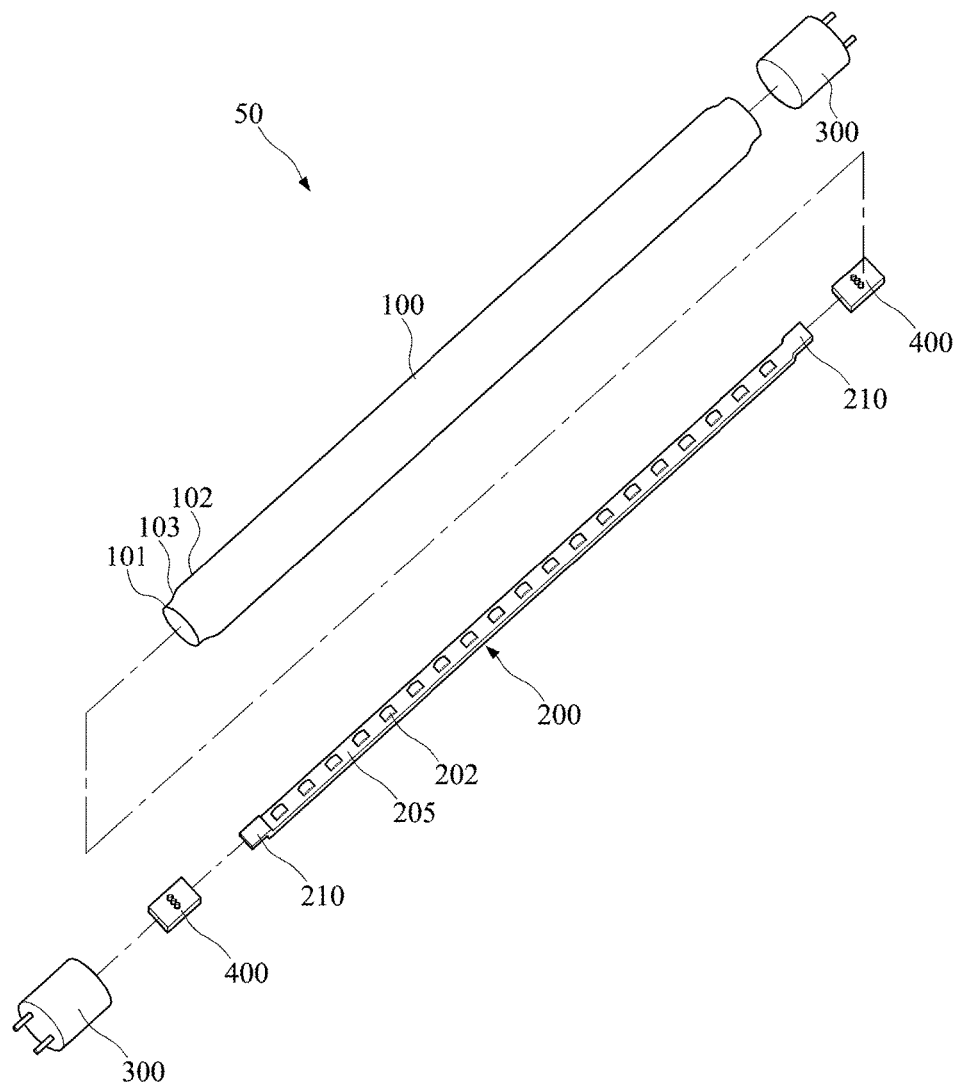
FIG. 5 illustrates an exploded view of an LED tube lamp including two parts of a power supply according to an embodiment of the instant disclosure.

In one embodiment, as shown in FIG. 5, two opposite, short edges of the bendable circuit sheet 205 may be formed as two freely extending end portions 210, and two parts of a power supply 400 are respectively disposed in the two end caps 300. The two freely extending end portions 210 respectively extends outside the glass tube 100 through two opposite ends of the glass tube 100 along the axial direction of the glass tube 100, such that can respectively extend into the two end caps 300 and be respectively electrically connected to the two parts of a power supply 400 directly.

Figure 6:
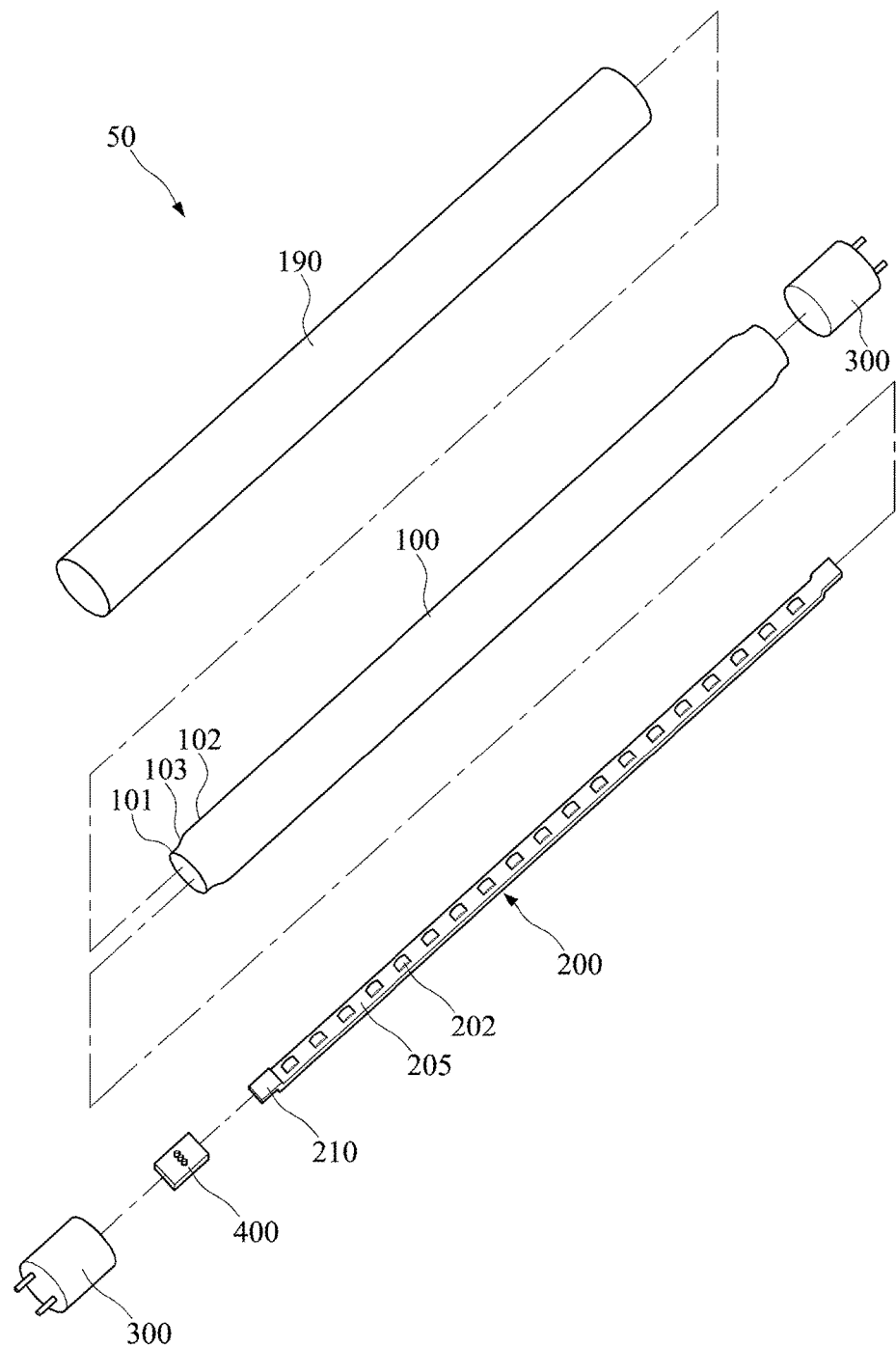
FIG. 6 illustrates an exploded view of an LED tube lamp including a heat shrink sleeve according to an embodiment of the instant disclosure.
Figure 7:
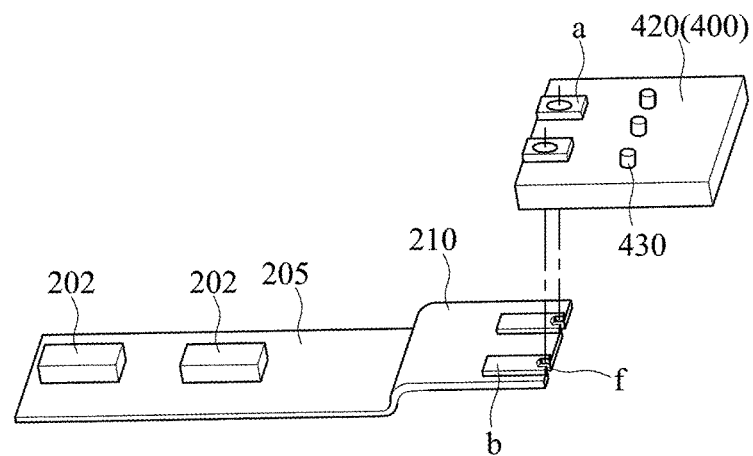
FIG. 7 illustrates a partial view of a bendable circuit sheet of an LED light strip and a power supply apart from each other according to an embodiment of the instant disclosure.
Figure 8:
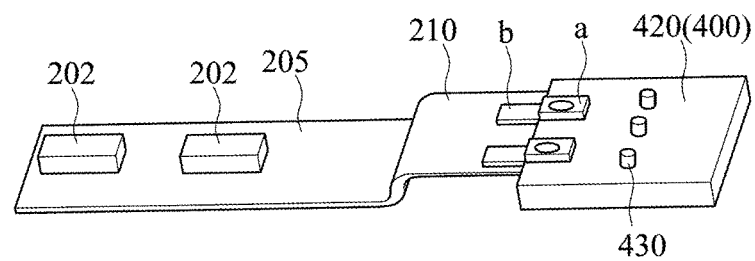
FIG. 8 illustrates a partial view of the bendable circuit sheet of the LED light strip and the power supply soldered to each other according to an embodiment of the instant disclosure.

Referring to FIG. 6, the LED tube lamp 50 may have a heat shrink sleeve 190 covering on the outer surface 100b of the glass tube 100. In some embodiments, the heat shrink sleeve 190 may have a thickness ranging between 20 μm and 200 μm and is substantially transparent with respect to the wavelength of light from the LED light sources 202. In some embodiments, the heat shrink sleeve 190 may be made of PFA (perfluoroalkoxy) or PTFE (polytetrafluoroethylene). The heat shrink sleeve 190 may be slightly larger than the glass tube 100, and may be shrunk and tightly cover the outer surface 100b of the glass tube 100 while being heated to an appropriate temperature (ex, 260° C. for PFA and PTFE).

Figure 9:
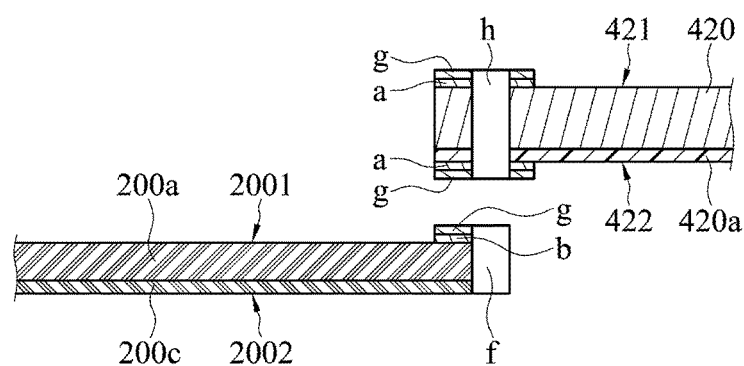
FIGS. 9 to 11 illustrate a soldering process of the bendable circuit sheet of the LED light strip and the power supply according to an embodiment of the instant disclosure.
Figure 10:
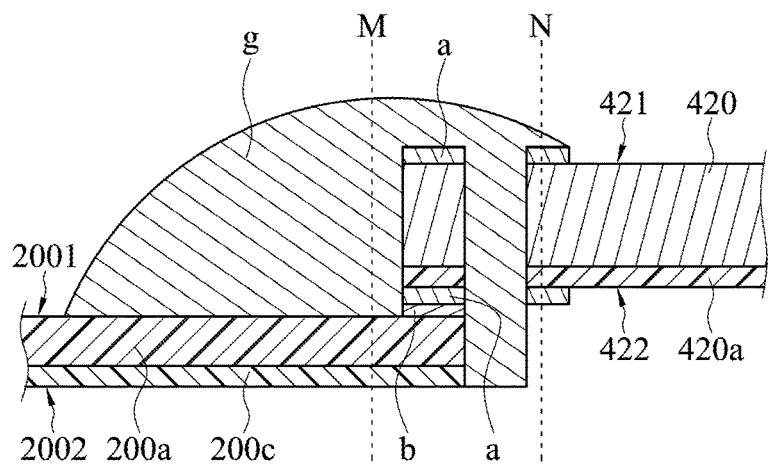
Figure 11:
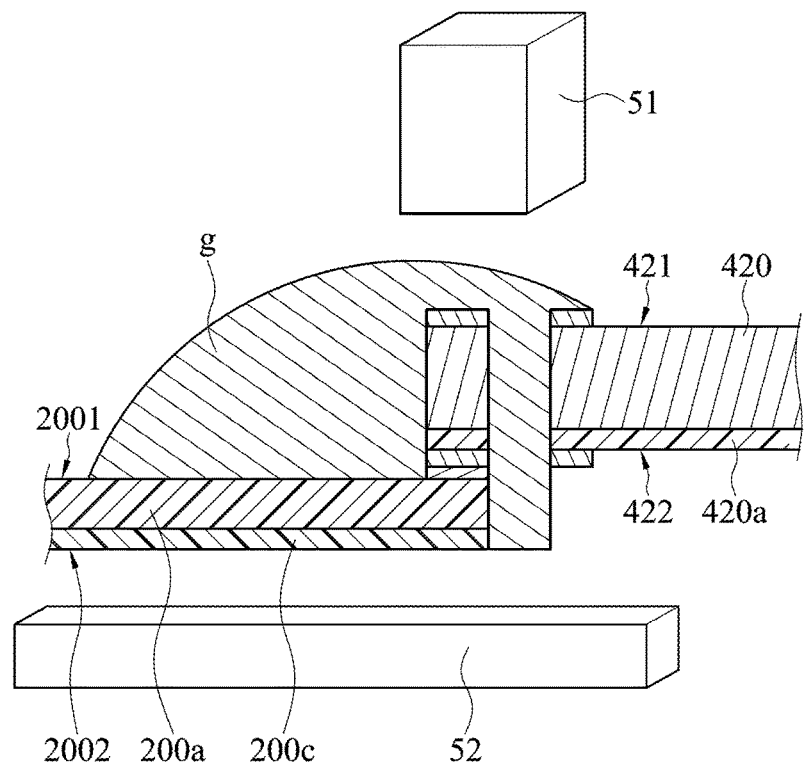

Referring to FIG. 7 to FIG. 11, FIG. 7 and FIG. 8 are respectively partial views of the bendable circuit sheet 205 of the LED light strip 200 and the printed circuit board 420 of the power supply 400 apart from and soldered to each other. FIG. 9 to FIG. 11 illustrate a soldering process of the bendable circuit sheet 205 of the LED light strip 200 and the printed circuit board 420 of the power supply 400. In the embodiment, the bendable circuit sheet 205 of the LED light strip 200 and the freely extending end portions 210 have the same structure. In some embodiments, the power supply 400 includes at least one electronic component 430 disposed on one side of the printed circuit board 420, and the freely extending end portion 210 is electrically connected to the printed circuit board 420 directly through the other side which has no electronic component 430 disposed thereon.

The freely extending end portions 210 are the portions of two opposite ends of the bendable circuit sheet 205 of the LED light strip 200 and are utilized for being connected to the printed circuit board 420 of the power supply 400. The LED light strip 200 and the power supply 400 can be electrically connected to each other by soldering. Two opposite ends of the bendable circuit sheet 205 of the LED light strip 200 are utilized for being respectively soldered directly to the printed circuit board 420 of the two parts of a power supply 400. In other embodiments, only one end of the bendable circuit sheet 205 of the LED light strip 200 is soldered directly to the printed circuit board 420 of the power supply 400. The bendable circuit sheet 205 of the LED light strip 200 includes a circuit layer 200a and a circuit protecting layer 200c over a side of the circuit layer 200a. Moreover, the bendable circuit sheet 205 of the LED light strip 200 includes two opposite surfaces which are a first surface 2001 and a second surface 2002. The first surface 2001 is the one on the circuit layer 200a and away from the circuit protecting layer 200c. The second surface 2002 is the other one on the circuit protecting layer 200c and away from the circuit layer 200a. Several LED light sources 202 are disposed on the first surface 2001 and are electrically connected to circuits of the circuit layer 200a. The circuit protecting layer 200c has less electrical and thermal conductivity but being beneficial to protect the circuits. The first surface 2001 of the bendable circuit sheet 205 of the LED light strip 200 includes soldering pads "b". Soldering material "g" can be placed on the soldering pads "b". In the embodiment, the LED light strip 200 further includes a notch "f". The notch "f" is disposed on an edge of the end of the bendable circuit sheet 205 of the LED light strip 200 soldered directly to the printed circuit board 420 of the power supply 400. The printed circuit board 420 includes a power circuit layer 420a and soldering pads "a". Moreover, the printed circuit board 420 includes two opposite surfaces which are a first surface 421 and a second surface 422. The second surface 422 is the one on the power circuit layer 420a. The soldering pads "a" are respectively disposed on the first surface 421 and the second surface 422. The soldering pads "a" on the first surface 421 are corresponding to those on the second surface 422. Soldering material "g" can be placed on the soldering pad "a". In the embodiment, considering the stability of soldering and the optimization of automatic process, the bendable circuit sheet 205 of LED light strip 200 is disposed below the printed circuit board 420 (the direction is referred to FIG. 9). That is to say, the first surface 2001 of the bendable circuit sheet 205 of the LED light strip 200 is connected to the second surface 422 of the printed circuit board 420 of the power supply 400.

As shown in FIG. 10 and FIG. 11, in the soldering process of the bendable circuit sheet 205 of the LED light strip 200 and the printed circuit board 420 of the power supply 400, the circuit protecting layer 200c of the bendable circuit sheet 205 of the LED light strip 200 is placed on a supporting table 52 (i.e., the second surface 2002 of the bendable circuit sheet 205 of the LED light strip 200 contacts the supporting table 52) in advance. The soldering pads "a" on the second surface 422 of the printed circuit board 420 of the power supply 400 directly sufficiently contact the soldering pads "b" on the first surface 2001 of the bendable circuit sheet 205 of the LED light strip 200. And then a thermo-compression heating head 51 presses on a portion where the bendable circuit sheet 205 of the LED light strip 200 and the printed circuit board 420 of the power supply 400 are soldered to each other. When soldering, the soldering pads "b" on the first surface 2001 of the bendable circuit sheet 205 of the LED light strip 200 contact the soldering pads "a" on the second surface 422 of the printed circuit board 420 of the power supply 400, and the soldering pads "a" on the first surface 421 of the printed circuit board 420 of the power supply 400 contact the thermo-compression heating head 51. Under the circumstances, the heat from the soldering thermo-compression heating head 51 can directly transmit through the soldering pads "a" on the first surface 421 of the printed circuit board 420 of the power supply 400 and the soldering pads "a" on the second surface 422 of the printed circuit board 420 of the power supply 400 to the soldering pads "b" on the first surface 2001 of the bendable circuit sheet 205 of the LED light strip 200. The transmission of the heat between the thermo-compression heating head 51 and the soldering pads "a" and b is not likely to be affected by the circuit protecting layer 200c which has relatively less thermal conductivity, and, consequently, the efficiency and stability regarding the connections and soldering process of the soldering pads "a" and "b" of the printed circuit board 420 of the power supply 400 and the bendable circuit sheet 205 of the LED light strip 200 can be improved. As shown in FIG. 10, the printed circuit board 420 of the power supply 400 and the bendable circuit sheet 205 of the LED light strip 200 are firmly connected to each other by the soldering material "g". Components between the virtual line M and the virtual line N of FIG. 10 from top to bottom are the soldering pads "a" on the first surface 421 of printed circuit board 420, the printed circuit board 420, the power circuit layer 420a, the soldering pads "a" on the second surface 422 of printed circuit board 420, the soldering pads "b" on the first surface 2001 of the bendable circuit sheet 205 of the LED light strip 200, the circuit layer 200a of the bendable circuit sheet 205 of the LED light strip 200, and the circuit protecting layer 200c of the bendable circuit sheet 205 of the LED light strip 200. The connection of the printed circuit board 420 of the power supply 400 and the bendable circuit sheet 205 of LED light strip 200 are firm and stable.

In other embodiments, an additional circuit protecting layer can be disposed over the first surface 2001 of the circuit layer 200a. In other words, the circuit layer 200a is sandwiched between two circuit protecting layers, and therefore the first surface 2001 of the circuit layer 200a can be protected by the circuit protecting layer. A part of the circuit layer 200a (the part having the soldering pads "b") is exposed for being connected to the soldering pads "a" of the printed circuit board 420 of the power supply 400. Under the circumstances, a part of the bottom of the LED light source 202 contacts the circuit protecting layer on the first surface 2001 of the circuit layer 200a, and the other part of the bottom of the LED light source 202 contacts the circuit layer 200a.

In addition, according to the embodiment shown in FIG. 7 to FIG. 11, the printed circuit board 420 of the power supply 400 further includes through holes "h" passing through the soldering pads "a". In an automatic soldering process, when the thermo-compression heating head 51 automatically presses the printed circuit board 420 of the power supply 400, the soldering material "g" on the soldering pads "a" can be pushed into the through holes "h" by the thermo-compression heating head 51 accordingly, which fits the needs of automatic process.

Figure 12:
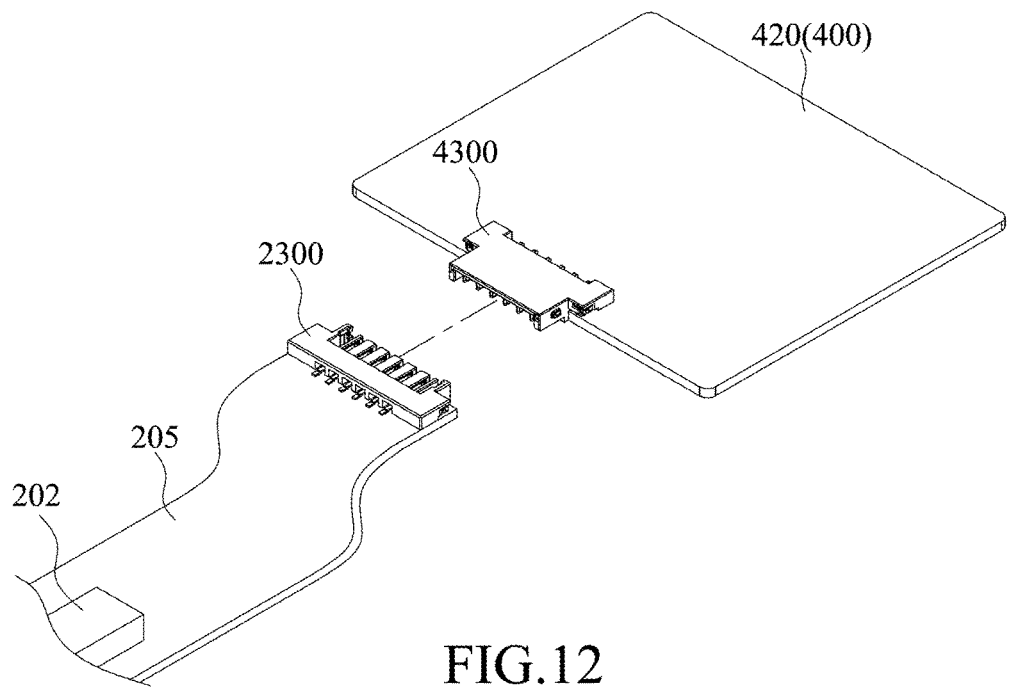
FIGS. 12 and 13 illustrate a bendable circuit sheet of an LED light strip and a power supply are electrically connected to each other by a pair of jack/plug connectors according to an embodiment of the instant disclosure.
Figure 13:
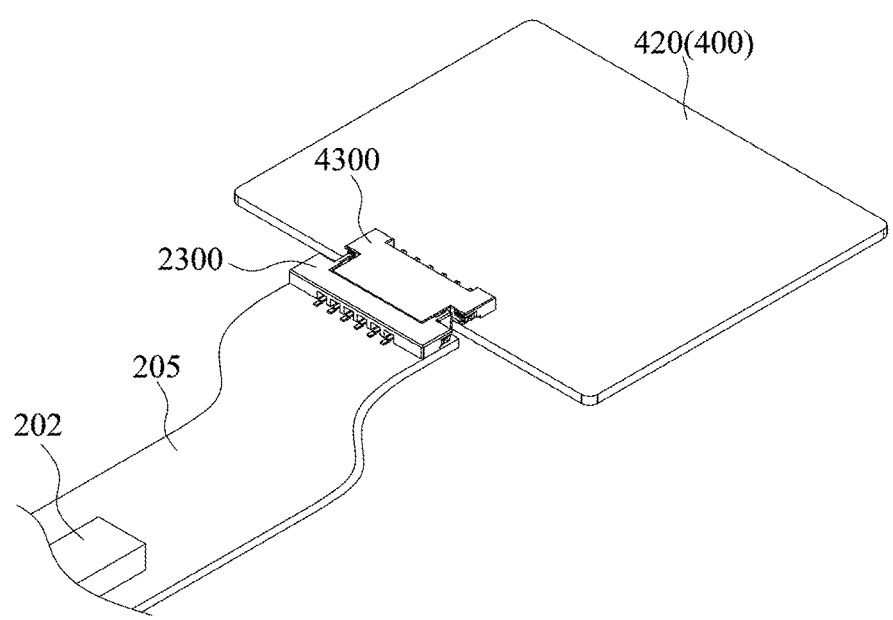

Referring to FIG. 12 and FIG. 13, in some embodiments, the bendable circuit sheet 205 of the LED light strip 200 and the printed circuit board 420 of the power supply 400 are electrically connected to each other by a pair of jack/plug connectors rather than by soldering. As shown in FIG. 12, the freely extending end portion 210 of the bendable circuit sheet 205 of the LED light strip 200 has a first electric connector 2300, and the printed circuit board 420 of the power supply 400 has a second electric connector 4300 which is capable of being connected with the first connector 2300. Since the LED light strip 200 and the power supply 400 are electrically connected to each other by a pair of jack/plug connectors rather than by soldering, the end cap 300 and the power supply 400 can be replaceable.

If any terms in this application conflict with terms used in any application(s) from which this application claims priority, or terms incorporated by reference into this application or the application(s) from which this application claims priority, a construction based on the terms as used or defined in this application should be applied.

While the instant disclosure related to an LED tube lamp has been described by way of example and in terms of the preferred embodiments, it is to be understood that the instant disclosure needs not be limited to the disclosed embodiments. For anyone skilled in the art, various modifications and improvements within the spirit of the instant disclosure are covered under the scope of the instant disclosure. The covered scope of the instant disclosure is based on the appended claims.

What is claimed is:

1. An LED tube lamp, comprising:
a glass tube comprising an inner surface and an outer surface, at least part of the inner surface of the glass tube is formed with a rough surface and the roughness of the rough surface is higher than that of the outer surface, the glass tube also comprises a main body region, two rear end regions, and two two-arc-shaped transition regions connecting the main body region and the rear end regions;
two end caps disposed at two ends of the glass tube;
a power supply provided inside the end cap(s); and
an LED light strip disposed inside the glass tube and provided with a plurality of LED light sources disposed thereon;
wherein the LED light strip includes a bendable circuit sheet mounted on an inner surface of the glass tube to electrically connect the LED light sources with the power supply, the projected length of the bendable circuit sheet is larger than the length of the glass tube to form a freely extending end portion at one end of the bendable circuit sheet along a longitudinal direction of the glass tube, the freely extending end portion is electrically connected to the power supply, and the glass tube and the end cap are secured by a hot melt adhesive.

2. The LED tube lamp of claim 1, wherein the roughness of the rough surface is from 0.1 to 40 μm.

3. The LED tube lamp of claim 1, wherein the bendable circuit sheet comprises a circuit layer and a circuit protecting layer, the circuit protecting layer is disposed on the circuit layer.

4. The LED tube lamp of claim 1, wherein the rough surface is formed as a light scattering region.

5. The LED tube lamp of claim 4, further comprising a reflective film disposed on a part of the inner surface of the glass tube which is not formed with the rough surface.

6. The LED tube lamp of claim 5, wherein a ratio of a length of the reflective film disposed on the inner surface of the glass tube extending along the circumferential direction of the glass tube to a circumferential length of the tube is about 0.3 to 0.5.

7. The LED tube lamp of claim 1, wherein the power supply is in one end cap or divided into two parts respectively in the two end caps.

8. An LED tube lamp, comprising:
a glass tube covered by a heat shrink sleeve, the glass tube comprises a main body region, two rear end regions, and two transition regions narrowed down or tapering smoothly and continuously from the main body region to the rear end regions connecting the main body region and the rear end regions;
two end caps disposed at two ends of the glass tube;
a power supply provided inside the end cap(s); and
an LED light strip disposed inside the glass tube and provided with a plurality of LED light sources disposed thereon;
wherein the LED light strip includes a bendable circuit sheet mounted on an inner surface of the glass tube to electrically connect the LED light sources with the power supply, the projected length of the bendable circuit sheet is larger than the length of the glass tube to form a freely extending end portion at one end of the bendable circuit sheet along a longitudinal direction of the glass tube, the freely extending end portion is electrically connected to the power supply, and the glass tube and the end cap are secured by a hot melt adhesive.

9. The LED tube lamp of claim 8, wherein the thickness of the heat shrink sleeve ranges from 20 μm to 200 μm.

10. The LED tube lamp of claim 8, wherein the heat shrink sleeve is substantially transparent with respect to the wavelength of light from the LED light sources.

11. The LED tube lamp of claim 8, wherein the bendable circuit sheet comprises a circuit layer and a circuit protecting layer, the circuit protecting layer is disposed on the circuit layer.

12. The LED tube lamp of claim 8, further comprising a reflective film disposed on a part of the inner surface of the glass tube.

13. The LED tube lamp of claim 12, wherein a ratio of a length of the reflective film disposed on the inner surface of the glass tube extending along the circumferential direction of the glass tube to a circumferential length of the tube is about 0.3 to 0.5.

14. The LED tube lamp of claim 8, wherein the power supply is in one end cap or divided into two parts respectively in the two end caps.

15. An LED tube lamp, comprising:
a glass tube comprising a main body region, two rear end regions, and two transition regions narrowed down or tapering smoothly and continuously from the main body region to the rear end regions connecting the main body region and the rear end regions;
two end caps disposed at two ends of the glass tube;
a power supply provided inside the end cap(s), the power supply comprises a print circuit board; and
an LED light strip disposed inside the glass tube and provided with a plurality of LED light sources disposed thereon;
wherein the LED light strip includes a bendable circuit sheet mounted on an inner surface of the glass tube, the projected length of the bendable circuit sheet is larger than that of the glass tube to form a freely extending end portion at one end of the bendable circuit sheet along a longitudinal direction of the glass tube, the freely extending end portion of the bendable circuit sheet is electrically connected to the printed circuit board of the power supply.

16. The LED tube lamp of claim 15, wherein the power supply further comprises at least one electronic component disposed on one side of the printed circuit board, and the freely extending end portion is electrically connected to the printed circuit board through the other side.

17. The LED tube lamp of claim 16, wherein the bendable circuit sheet comprises a circuit layer and a circuit protecting layer disposed on the circuit layer.

18. The LED tube lamp of claim 17, wherein the circuit protecting layer of the freely extending end portion contacts the other side of the printed circuit board.

19. The LED tube lamp of claim 18, wherein the printed circuit board comprises a through hole, and the freely extending end portion comprises a notch corresponding to the through hole.

20. The LED tube lamp of claim 19, further comprising a soldering material penetrating the through hole and filling into the notch, so as to make the freely extending end portion be electrically connected to the printed circuit board.

\* \* \* \* \*